March 11, 1941. W. H. ALLEN 2,234,793
GAS TURBINE
Filed Dec. 14, 1939
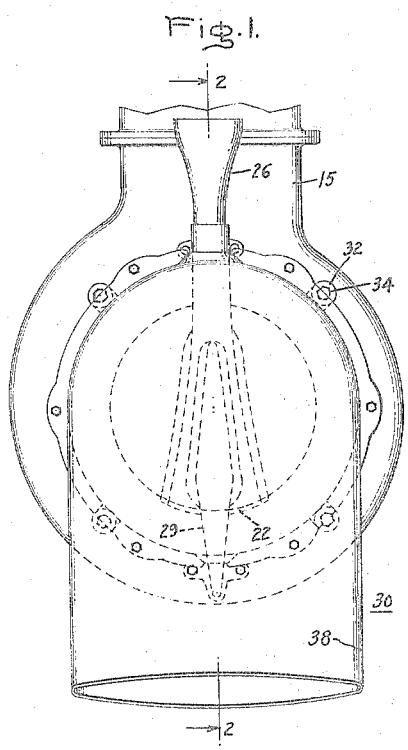
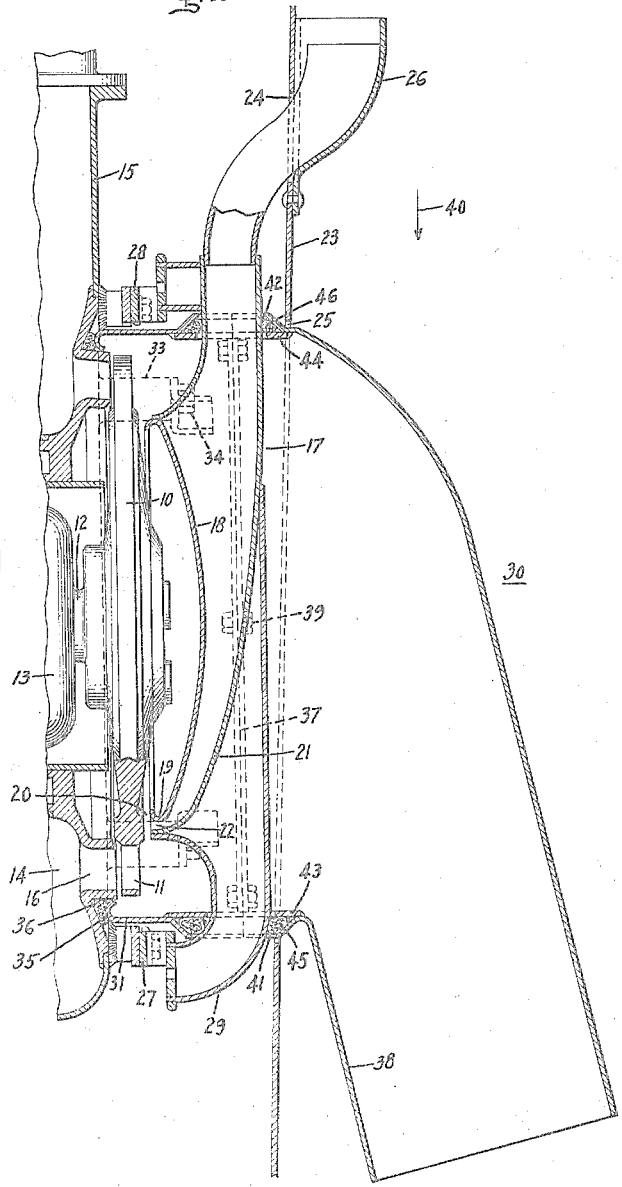
Inventor:
Wayne H. Allen,
by Harry E. Dunham
His Attorney.

Patented Mar. 11, 1941

2,234,793

UNITED STATES PATENT OFFICE 2,234,793

GAS TURBINE

Wayne H. Allen, Lynn, Mass., assignor to General Electric Company, a corporation of New York Application December 14, 1939, Serial No. 309,234

4 Claims. (Cl. 60—41)

The present invention relates to gas turbines, more particularly to the type of turbines operated by exhaust gases from a combustion engine as are used on aircraft for driving superchargers or like aircraft auxiliaries. In the usual arrangement of this kind, exhaust gases are directed towards a bucket wheel from a nozzle box located in one side of the wheel. Gases are discharged from the other side of the wheel either directly into the atmosphere, in which case this other side of the wheel is directly disposed to the atmosphere, or the discharge of gas from the wheel into the atmosphere may be accomplished by an exhaust casing surrounding the wheel and having an opening in the direction of the slip stream of the aircraft.

The object of my invention is to provide an improved construction and arrangement of gas turbines of the type aforementioned.

For a consideration of what I consider to be novel and my invention, attention is directed to the following description and the claims appended thereto in connection with the accompanying drawing.

In the drawing, Fig. 1 illustrates a plan view of a gas turbine arrangement in accordance with my invention, and Fig. 2 is a sectional view along line 2—2 of Fig. 1.

The arrangement comprises a bucket wheel 10 with a row of buckets 11 secured to an overhung portion of a shaft 12 which is supported on a bearing 13 and may serve for driving a supercharger or the like, not shown. Exhaust gases from a combustion engine or like source, not shown, are conducted to a nozzle box 14 which has a flanged inlet conduit 15 and a row of nozzles 16 for properly directing the gases towards the buckets 11 of the wheel 10. The nozzle box is located on one side of the wheel. A device 17 is located on the other side of the wheel for cooling the wheel and preventing gases discharged from the wheel from contacting the central portion thereof. The device 17 comprises a cup-shaped disk 18 adjacent the wheel with an edge 19 in close proximity to the rim of the wheel to form a small clearance 20 therewith in order to prevent flow of gases discharged from the wheel towards the central portion thereof. A conduit 21 is secured to the disk 18 extending diametrically across the disk and forming with the latter a discharge opening 22 for discharging cooling medium towards a short section of the rim of the bucket wheel 10. Cooling medium in the form of air may be supplied to the conduit 21 from the slip stream of an aircraft. In the present instance I have indicated an aircraft having an outer wall 23 with openings 24 and 25. Cooling air is conducted to the conduit 21 by a channel 26 projecting through the opening 24 of the wall 23. The cooling and protecting device 17 is supported on the nozzle box by means of brackets 27 and 28. The bracket 27 is connected to an extension 29 of the device 17 and the bracket 28 is connected to the upper end of the conduit 21.

The arrangement so far described is more fully disclosed in the copending application of C. W. Smith, Serial No. 281,562, filed on June 28, 1939, and assigned to the same assignee as the present application.

In order to conduct gases discharged from the turbine wheel 10 to the atmosphere, I provide an exhaust casing 30. The exhaust casing according to my invention comprises a ring 31 concentrically surrounding the bucket wheel 10 and secured to and supported on the nozzle box 14 by means of four uniformly spaced lugs 32. These lugs are welded to the ring 31 and are fastened to posts 33 on the nozzle box by bolts 34. The left-hand edge of the ring 31 forms a bent 35 which is biased into intimate contact with a packing ring 36 of soft, heat-resistant material located in an annular groove of the nozzle box 14. The right-hand portion of the ring 31 forms a flange 37. An exhaust conduit or flight hood 38 is secured to the flange 37 by bolts 39 and projects through the opening 25 in the aircraft wall 23. The conduit 38 opens in the direction of the slip stream indicated by an arrow 40 whereby the discharge of exhaust gases is aided by the slip stream effect. The bolting of the flight hood 38 to the ring 31 and the bolting of the latter to the supercharger by a plurality of bolts permits the flight hood always to be installed so that the hot gases are discharged therefrom in rearward direction, that is, in the direction of the slip stream, regardless of the location and relationship of any of the other supercharger openings. The extension or bracket 29 and the conduit 21 of the cooling device project through openings 41 and 42 of adjacent portions of the ring 31 and the conduit 38. The walls forming the openings 41 and 42 are conically bent outward and rings 43 and 44 are welded to these conically bent wall portions to form grooves for accommodating and retaining packings 45 and 46 respectively. The rings 43 and 44 and the conically-shaped wall portions form sufficient clearances with the adjacent portions of the device 17 to permit relative expansion between the device and the exhaust casing during operation. Such clearance is also formed between the exhaust casing, more specifically the exhaust conduit 38 and the opening 25 of the wall 23. During operation, exhaust gases discharged from the bucket wheel and cooling air conducted to the wheel by the device 17 are discharged into the atmosphere by the exhaust casing 30.

What I claim as new and desire to secure by Letters Patent of the United States is:

1. Gas turbine arrangement comprising a bucket wheel having a row of buckets, a nozzle box located on one side of the wheel and having a row of nozzles for directing operating gases towards the buckets, a protecting and cooling device located on the other side of the wheel and having a conduit for conducting cooling air to the wheel, means supporting the device on the nozzle box, and an exhaust casing for receiving gases discharged from the wheel enclosing said device and having an opening sealed to the conduit, said casing comprising a ring and a conduit flanged together and means detachably securing and sealing the ring to the nozzle box.

2. Gas turbine arrangement comprising a bucket wheel, a nozzle box located on one side of the wheel and having a wall forming an annular groove, a protecting and cooling device located on the other side of the wheel and having a conduit for receiving cooling air, and an exhaust casing for receiving gases discharged from the wheel, said casing comprising a ring having an edge projecting into the annular groove, flexible sealing means in the groove, and means biasing the ring towards the flexible sealing means and supporting the ring on the nozzle box.

3. Gas turbine arrangement comprising a bucket wheel having a row of buckets, a nozzle box located on one side of the wheel and having a row of nozzles for directing operating gases towards the buckets, a protecting and cooling device located on the other side of the wheel and having a supply conduit for conducting cooling air to the wheel, means supporting the device on the nozzle box, and an exhaust casing for receiving gases discharged from the wheel, said casing comprising a ring and a conduit flanged together, the ring having an edge adjacent the nozzle box, means including a plurality of lugs supporting the ring on the nozzle box and biasing the ring into sealing contact with the nozzle box, adjacent portions of the flanged ring and exhaust conduit forming an opening through which the supply conduit of the cooling device projects and flexible packing means to reduce leakage past said opening and to permit relative expansion between the supply conduit and the exhaust casing.

4. Gas turbine arrangement for aircraft comprising a bucket wheel, a nozzle box located on one side of the wheel, a cooling device for the wheel located on the other side thereof, an exhaust casing comprising a ring and a conduit for receiving gases discharged from the wheel enclosing said device and having an opening sealed to the conduit, and means including a plurality of bolts securing the conduit to the ring and the ring to the nozzle box and permitting adjustment of the conduit to effect discharge of gases in direction of the slip stream of an aircraft regardless of the relative location of other turbine elements.

WAYNE H. ALLEN.